United States Patent [19]

Setoyama

[11] Patent Number: 5,546,243
[45] Date of Patent: Aug. 13, 1996

[54] DATA AND SYNCHRONIZATION SIGNAL OUTPUTTING APPARATUS FOR RECOVERING MISSING DATA AND SYNCHRONIZATION SIGNALS

[75] Inventor: Tohru Setoyama, Kokubunji, Japan

[73] Assignee: Hitachi, Ltd., Tokyo, Japan

[21] Appl. No.: 137,993

[22] Filed: Oct. 19, 1993

[30]  Foreign Application Priority Data

Oct. 22, 1992 [JP] Japan ................................. 4-284190

[51] Int. Cl.⁶ ............................. G11B 5/09; G11B 15/12
[52] U.S. Cl. .................................................. 360/51; 360/61
[58] Field of Search .................................. 360/49, 51, 61, 360/32, 53

[56]  References Cited

U.S. PATENT DOCUMENTS 4,433,348  2/1984  Stockham, Jr. et al. .................. 360/51
4,525,840  6/1985  Heinz et al. ................................ 360/51
4,805,046  2/1989  Kuroki et al. ............................. 360/51
4,858,035  8/1989  Hikawa ...................................... 360/51

FOREIGN PATENT DOCUMENTS 63-90070  4/1988  Japan .

*Primary Examiner*—W. Chris Kim
*Attorney, Agent, or Firm*—Antonelli, Terry, Stout & Kraus

[57]  ABSTRACT

A data signal and a sync signal outputting apparatus comprises a memory for storing a serial signal selector circuit for selectively producing an output signal SD of the memory or the serial signal. The output circuit extracts a sync pattern, and a data section from the selector output signal. A sync pulse is generated for each sync pattern to produce a sync signal CK. At the same time, each data block is produced in parallel to the sync signal CK as a data signal $S_0$. A controller, upon detection of an extraction failure, controls the memory in such a manner as to produce the stored serial signal from the memory and controls the selector to select an output signal from the memory.

7 Claims, 6 Drawing Sheets

DATA AND SYNCHRONIZATION SIGNAL OUTPUTTING APPARATUS FOR RECOVERING MISSING DATA AND SYNCHRONIZATION SIGNALS

BACKGROUND OF THE INVENTION

1. Field of the Invention

The present invention relates to a data outputting apparatus for a digital magnetic recording system, or more in particular, to a data outputting apparatus for extracting sync patterns from a serial playback signal containing a plurality of data blocks segmented by the sync patterns, outputting a sync signal in accordance with the sync patterns, and outputting data converted in parallel and in synchronism with the sync signal.

2. Description of the Prior Art

In a magnetic tape system of helical scan type for writing and reading a digital signal, the read signal reproduced from the magnetic tape is a serial signal having a plurality of discontinuous data segments each containing a plurality of successive pairs of sync patterns and data blocks.

A data outputting apparatus extracts sync patterns from such a serial signal, generates and outputs a sync signal including a sync pulse for each sync pattern, and outputs parallel data in synchronism with and in parallel to the particular sync signal. This data outputting apparatus, even in the case of failure to extract a sync pattern, has the function of generating a protected sync pulse on the basis of the predetermined period τ of a sync pattern and preventing the sync pulse from dropping off from the sync signal. When a protected sync pulse is generated, the data outputting apparatus converts a serial signal into a parallel signal as a data signal in response to the phase of the protected sync pulse. Then, once a sync pattern is rightly extracted, a serial signal is rightly converted into a parallel signal and a right data signal can be output even when extraction of the sync pattern ends in failure. When extraction of the leading sync pattern of a leading data segment fails, however, the serial signal is not rightly converted into the parallel signal, and therefore the data in the leading data block disappears.

In order to prevent this inconvenience, first, a sync pattern is extracted from a serial signal, and a sync pulse is generated for each extracted sync pattern to provide a first sync signal. Also, the serial signal is delayed by a factor of an integral multiple of the period of the sync pattern, the sync pattern is extracted from the delayed serial signal, and a sync pulse is generated for each extracted sync pattern to thereby provide a second sync signal. The first sync signal and the second sync signal are ORed, and the resulting logic sum is used as a new sync signal. Such a technique is proposed by JP-A-63-90070. This conventional method is described with reference to FIGS. 8A to 8E. The protected sync pulse before right extraction of a sync pattern is not necessary and ignored by way of explanation.

Figure 8A:
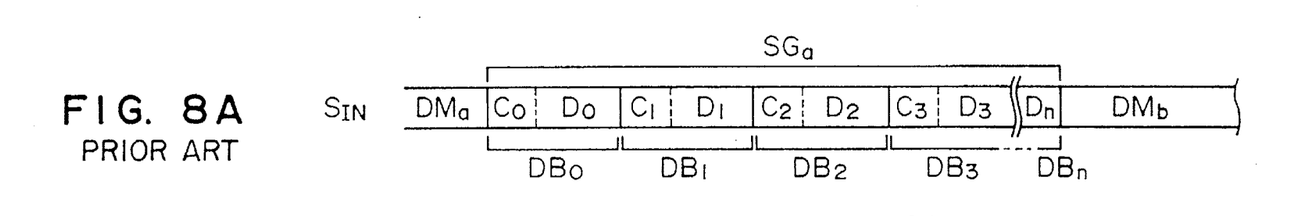
FIGS. 8A to 8E are timing charts for explaining the prior art.
Figure 8B:
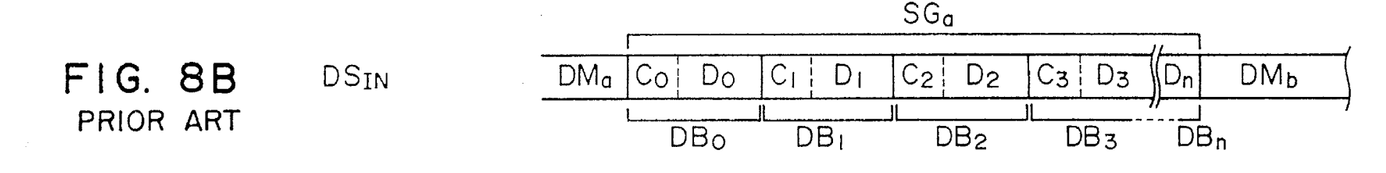
Figure 8C:
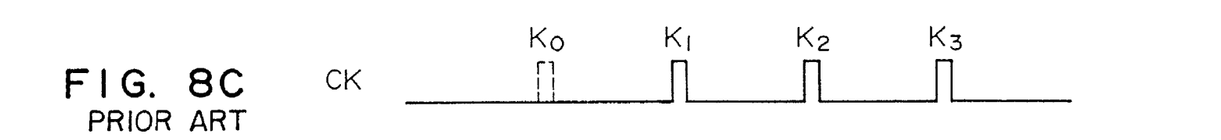
Figure 8D:
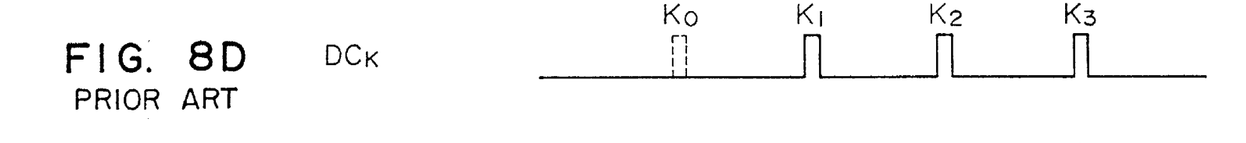
Figure 8E:
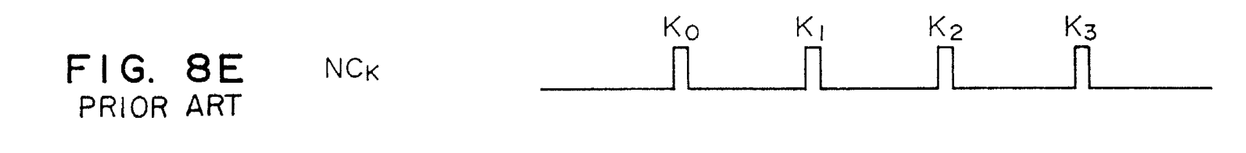

FIG. 8A shows a serial signal $S_{IN}$. In this serial signal $S_{IN}$, $DM_a$ designates a dummy data block, $SG_a$ a leading data segment, $DB_i$ (i=0 to n) a data block, $C_i$ a sync pattern, and $D_i$ a data section. FIG. 8B shows a delayed serial signal $DS_{IN}$. The signal $DS_{IN}$ is a serial signal $S_{IN}$ delayed by one predetermined period of a sync pattern. FIG. 8C shows a first sync signal CK including a sync pulse $K_j$ generated from the sync pattern $C_j$ (j=1 to 3) extracted from the serial signal $S_{IN}$. Due to the failure to extract the sync pattern $C_0$ of the leading data block $DB_0$, the sync pulse $K_0$ corresponding to the sync pattern $C_0$ is lacking. FIG. 8D shows a second sync signal $DC_K$ including a sync pulse $K_j$ generated from the sync pattern $C_j$ extracted from the signal $DS_{IN}$. In this case, too, extraction of the sync pattern $C_0$ of the leading data block $DB_0$ has failed, and therefore the sync pulse $K_0$ corresponding to the sync pattern $C_0$ is lacking. FIG. 8E shows a new sync signal $NC_K$ that has been obtained by logic addition of the first sync signal CK and the second sync signal $NC_K$. The data block $DB_i$ is extracted from the signal $DS_{IN}$ on the basis of the sync signal $K_i$ of the new sync signal $NC_K$, and the data contained in the data section $D_i$ is synchronized with the sync pulse of the new sync signal $NC_K$ and is output in parallel to the new sync signal $NC_K$. The drop-off of the leading sync pulse $K_0$ is thus prevented. As a result, the data $D_0$ of the leading data block $DB_0$ is also prevented from dropping off.

In the conventional apparatus, a serial signal is delayed by a factor of N times (N is a positive integer) of the period of a sync pattern, but a failure to extract a sync pattern for N' times (N' is an integer greater than or equal to N) of leading sync patterns makes it impossible to prevent the leading sync pulse from dropping off, leading to the problem of disappearance of the leading data. In the case where an attempt to extract the sync patterns $C_0$, $C_1$ in FIG. 8A has failed, for example, the sync pulses $K_0$, $K_1$ drop off from the first sync signal CK, and so do the sync pulses $K_0$, $K_1$ from the second sync signal $NC_K$. Thus the sync pulse $K_0$ also drops off from the new sync signal $NC_K$ which provides a logic sum, with the result that the data $D_0$ disappears from the leading data block $DB_0$.

SUMMARY OF THE INVENTION

Accordingly, it is an object of the present invention to provide a data outputting apparatus which is capable of preventing the leading sync pulse from dropping off from a sync signal and the corresponding leading data from disappearing positively.

According to the present invention, there is provided a data outputting apparatus comprising means for extracting a sync pattern from a serial signal including a plurality of data blocks segmented by the sync pattern, means for outputting a sync signal corresponding to the particular sync pattern, means for outputting data converted in parallel and in synchronism with the sync signal as a data signal, means for storing a serial signal or a data signal, and control means for monitoring whether an attempt to extract the sync pattern is successful or a failure, and upon detection of an extraction failure, reading a serial signal or data signal containing the sync pattern involved in failure from the storage means, and outputting the data corresponding to the sync pattern involved in extraction failure in parallel to the sync signal by converting it into a data signal.

In a data outputting apparatus according to the invention, a serial signal or a data signal is stored in storage means, and upon failure to extract a sync pattern, the serial signal or data signal containing the particular sync pattern is read from storage means, and right data is generated and output in parallel to the sync signal. In other words, even if an extraction attempt fails successively from the leading sync pattern, the data corresponding to the sync pattern involved in failure is rightly restored and output as far as the capacity of the storage means is proper.

Consequently, the drop-off of the leading sync pulse of the sync signal and the disappearance of the corresponding leading data are positively prevented.

DESCRIPTION OF THE PREFERRED EMBODIMENTS

A data outputting apparatus according to the present invention will be explained in detail with reference to the accompanying drawings. The present invention is not limited in any manner, however, by the explanation of embodiments made below.

First, explanation will be made about a digital magnetic recording apparatus of helical scan type to which the data signal and sync signal outputting apparatus according to the invention is applicable with reference to FIG. 9.

Figure 9:
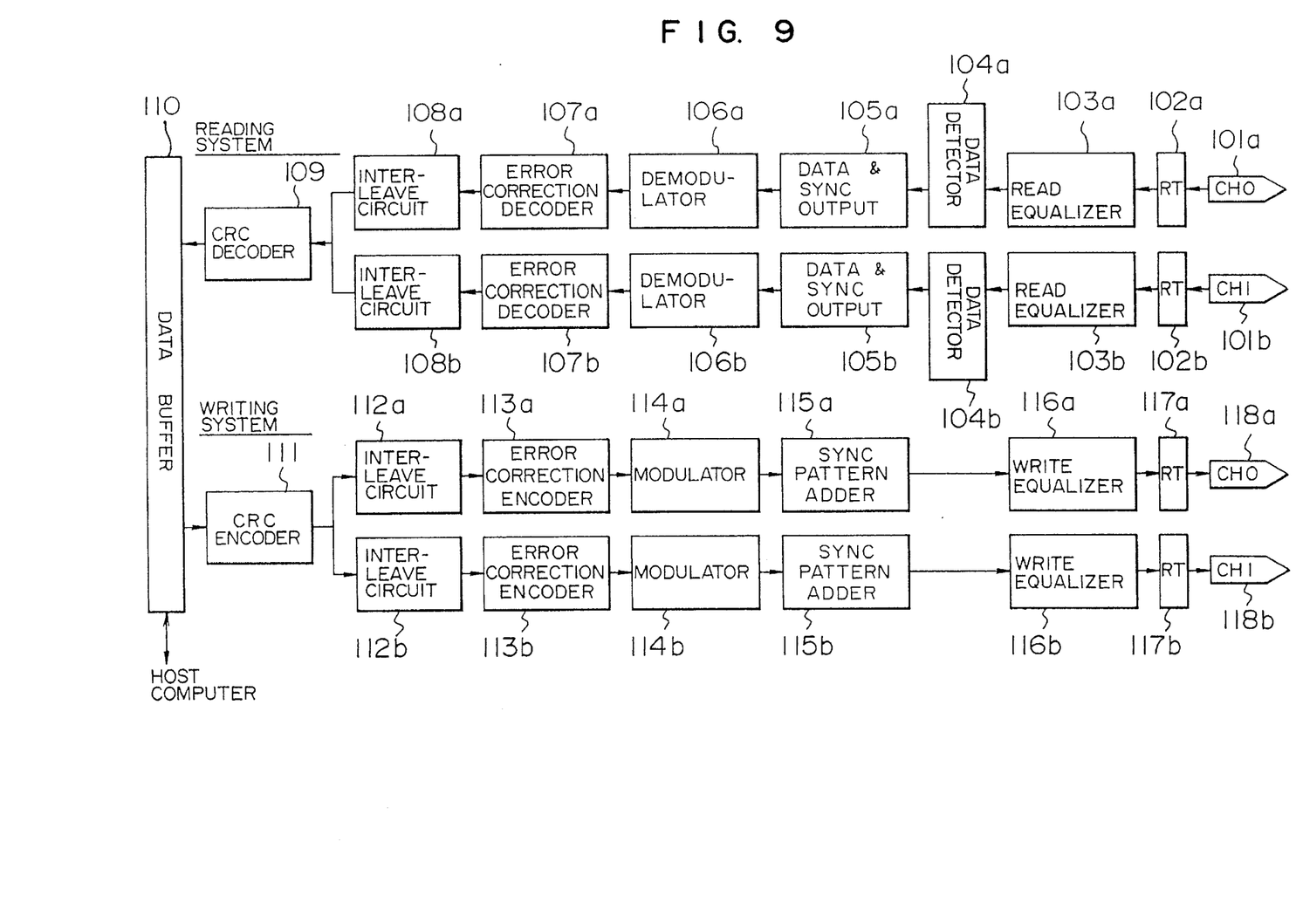
FIG. 9 is a diagram showing a general configuration of a digital magnetic recording apparatus of helical scan type to which the data signal and sync signal outputting apparatus according to the invention is applicable.

FIG. 9 is a block diagram showing an MT apparatus of helical scan type with a standard configuration. The MT apparatus is generally configured of a plurality of channels, although only two channels CH0 and CH1 are shown. The operation is exactly the same for all channels, and therefore description will be made only about CH0.

Reference is made first to the writing system. The data transferred from a host computer, after being stored in data buffer 110, is sent to a CRC (Cyclic Redundancy check Code) encode circuit 111. The CRC is for detecting an error which may occur during writing and recording (playback). After the CRC is added to the data, the data is divided and transferred among the channels. The data is re-arranged by an interleave circuit 112, and then a parity check code is added to the data by an error correction encoding circuit 113. The error correction code is for detecting and correcting the error which may occur in the writing and reading systems by the use of a parity check code. The data re-arrangement by the interleave circuit 112 is for improving the correction ability of the error correction code. The data is then encoded by a modulation circuit 114. The magnetic writing and reading systems have such a characteristic that low-frequency components are difficult to record, and the data is encoded to change the data characteristics since the DC component cannot be transferred by a rotary transformer 112. The data is divided into sync blocks of a predetermined length, and a sync pattern is added to the head of each block by a sync pattern addition circuit 115. This sync pattern is used for detecting a data block at the time of read back. A recording equalizing circuit 116 then shapes the digital waveform into an analog waveform in such a manner as to conform to the characteristics of the magnetic writing and reading systems. The resulting waveform is recorded on the magnetic tape through a rotary transformer 117 and a recording head 118.

The reading system will be explained. The data recorded on the magnetic tape is sent to a read equalizing circuit 103 through a read head 101 and a rotary transformer 102. This is in order to facilitate the data detection by shaping, because the read signal causes interference with an adjacent bit due to the differentiation characteristic of the magnetic recording system. The read signal is then supplied to a data detection circuit 104. The read signal, which is a digital signal, is dulled through a magnetic recording system to such an extent that it cannot be supplied to the digital circuit directly. In view of this, the data detection circuit 104 restores the digital signal by determining 0 or 1 according to the amplitude value, etc. The signal is then supplied to a data signal and sync signal Outputting apparatus 105 according to the invention for detecting a sync pattern added by the sync pattern addition circuit 115 to cut out each sync block. The subsequent signal processings are carried out in units of this sync block. The read signal is supplied to a demodulation circuit 106 by which the signal encoded by the modulation circuit 114 is restored to the original signal. An error correction code decoding circuit 107 corrects the error in the magnetic recording process, and an interleave circuit 108 restores the data arrangement to the original sequence. The data on each channel are integrated and an error is detected at a CRC decode circuit 109. If no error is detected, the read data is written in a data buffer 110 and sequentially transferred to the host computer. When any error is detected, on the other hand, the data is read from the magnetic tape again, and the above-mentioned process is repeated.

Figure 1:
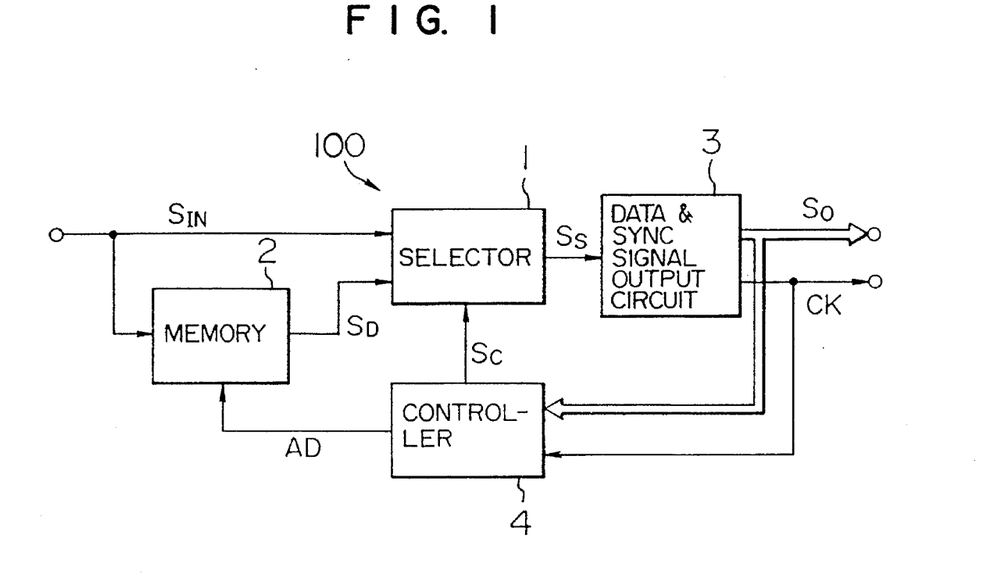
FIG. 1 is a block diagram showing a data sync output apparatus according to a first embodiment of the present invention.

FIG. 1 is a block diagram showing the data signal and sync signal outputting apparatus according to a first embodiment of the invention.

Figure 2:
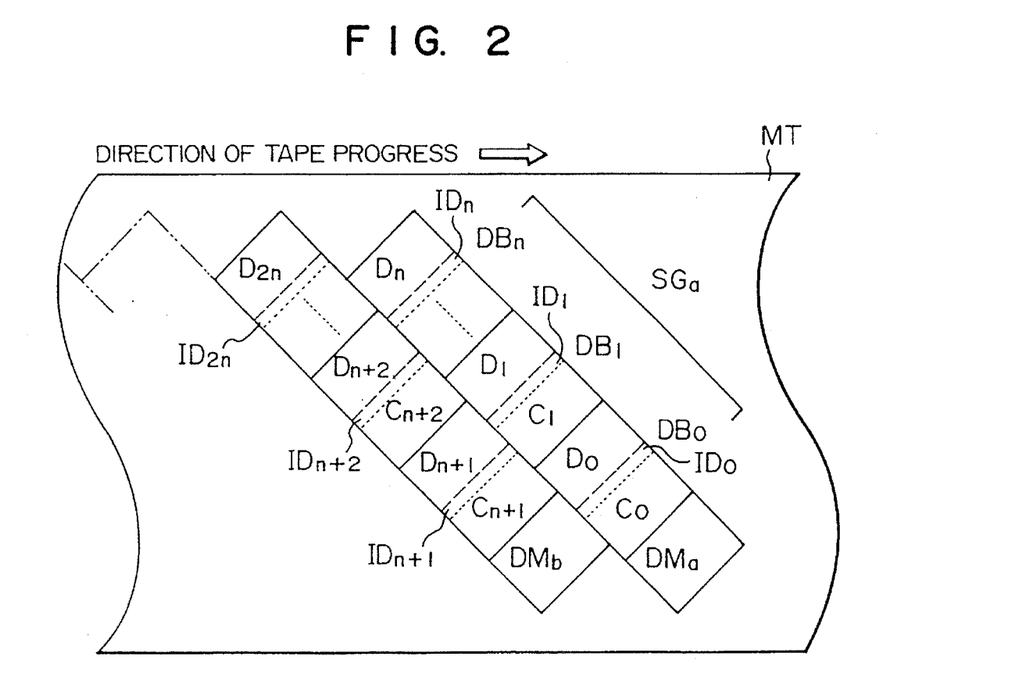
FIG. 2 is a diagram for explaining the magnetic tape method for recording a digital signal by the helical scan method.
Figures 3A, 3B:
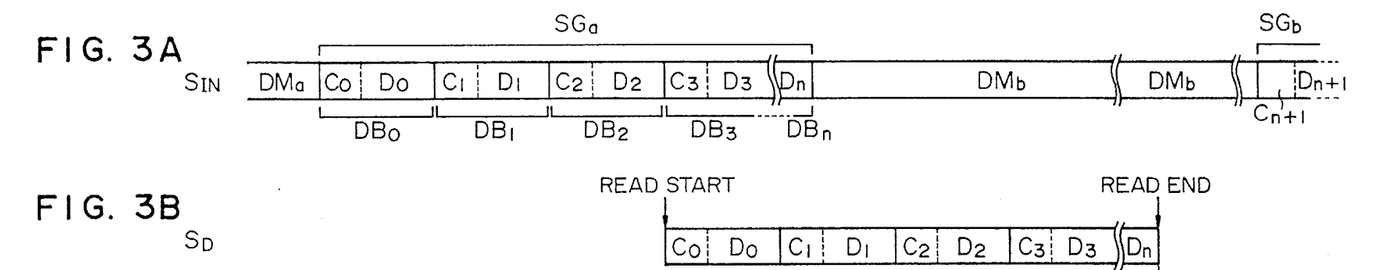
FIGS. 3A to 3E are timing charts for explaining the operation of the data signal and sync signal outputting apparatus shown in FIG. 1.
Figures 3C, 3D:
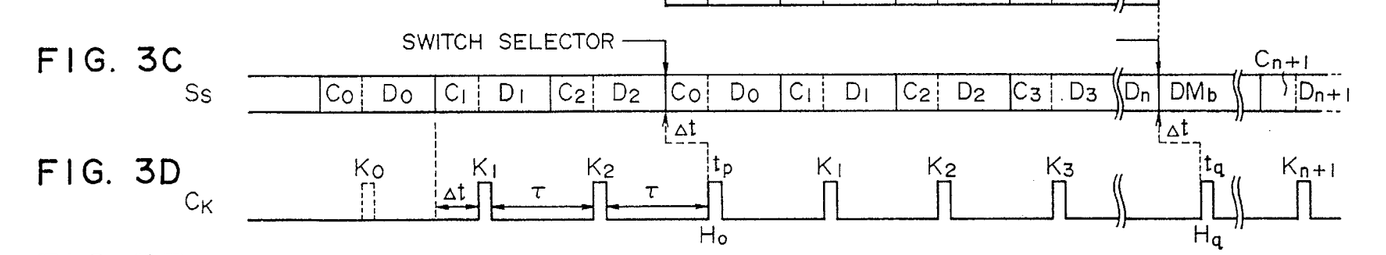
Figure 3E:
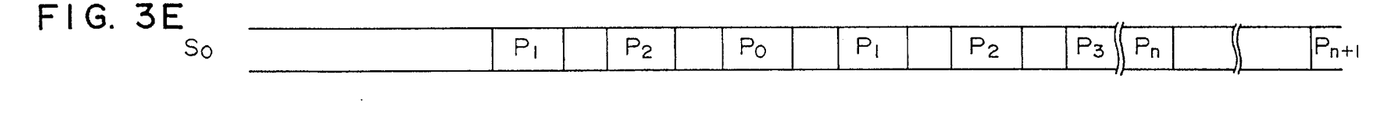

This data outputting apparatus 100 is supplied with a read serial signal $S_{IN}$ from the magnetic tape of helical scan type. FIG. 2 shows a recording format for the magnetic tape MT. In the leading recording region of MT is recorded a dummy data area $DM_a$ followed by a leading data segment $SG_a$. The $SG_a$ includes data blocks $DB_0$ to $DB_n$. Each data block $DB_i$ (i=0 to n) is composed of a sync pattern $C_i$, a data section $D_i$ and an ID area $ID_i$. In the next recording region is recorded a dummy data area $DM_b$ followed by a second data segment $SG_b$, which is configured the same way as the first data segment. FIG. 3A shows the construction of a serial signal $S_{IN}$.

Returning to FIG. 1, the serial signal $S_{IN}$ is supplied to a selector (SEL) 1 on the one hand and to a memory 2 on the other hand. The selector 1 selects and outputs the serial signal $S_{IN}$ or the serial signal SD read from the memory 2. The memory 2 stores the latest serial signal $S_{IN}$ up to the storage capacity thereof. The storage capacity for one data segment in maximum and at least three data blocks is required. The memory 2 supplies the selector 1 with a serial signal $S_{IN}$ subsequent to the portion specified by a read command AD from a controller (CTRL) 4 as a serial signal $S_D$.

The data and sync signal output circuit 3 extracts the sync pattern and the data section from the output signal $S_s$ of the selector 1. A sync pulse is generated for each sync pattern and is output as a sync signal CK. The data block is output as a data signal $S_0$ in parallel and in synchronism with the sync signal CK. The data signal $S_0$ is an 8-bit parallel signal, for example.

The output circuit 3 has the function of generating a protected sync pulse in accordance with the predetermined period of a sync pattern when a sync pattern cannot be extracted.

The controller 4 is for reading the data signal $S_0$ in synchronism with the signal CK and analyzes the data signal $S_0$ to extract an ID section, thereby monitoring whether the output circuit 3 has successfully extracted the sync pattern. In the case where the data ID appears without drop-off from "$DB_0$", for instance, success is determined. When there is any drop-off, on the other hand, failure is the determination. While an initial state or success is determined, a switching command $S_C$ is sent to the selector 1 in such a manner as to cause the selector 1 to select the serial signal $S_{IN}$. In the case of a failure determination, by contrast, a read command AD is sent to the memory 2 to read the data block including and subsequent to the one corresponding to the ID of the data dropped off. The timing of reading the memory 2 and switching the selector 1 are determined by setting the serial signal $S_D$ to the time of appearance of the next sync pulse (or protected sync pulse) predicted from the current sync pulse of the signal CK.

Now, the operation of the output apparatus 100 will be specifically explained with reference to FIGS. 3A to 3E. It should be noted that the ID sections are included in the data sections and therefore they are omitted.

First, in the initial stage, the selector 1 selects the serial signal $S_{IN}$, and therefore the serial signal $S_{IN}$ is directly output as an output signal $S_s$ from the selector 1. The output circuit 3 attempts to extract the leading sync pattern $C_0$ of the output signal $S_s$ from the selector 1. However, the extraction attempt is assumed to end in failure because the sync pattern is changed by noises, for example. As a result, the leading sync pulse $K_0$ drops off, and so does the leading data $D_0$.

Assume that the output circuit 3 successfully extracts the sync pattern $C_1$ of the output signal $S_s$. In this case, the output circuit 3 generates the sync pulse $K_1$ delayed by a predetermined period of time $\Delta t$ from the starting time of the sync pattern $C_1$, and outputs it as a sync signal CK. Also, the data $P_1$ generated from the data section $D_1$ corresponding to the sync pattern $C_1$ is output as a data signal $S_0$ in synchronism with the sync pulse $K_1$. The controller 4 fetches the data $P_1$ synchronous with the sync pulse $K_1$ and checks the ID of the data $P_1$. In the case under consideration, the ID is "$DB_1$". Whether this ID is right or not is unknown at this time. Therefore, the reading from the memory 2 or the switching of the selector 1 is not carried out.

Next, the output circuit 3 is assumed to have succeeded in extracting the sync pattern $C_2$ of the output signal $S_s$. In this case the output circuit 3 generates the sync pulse $K_2$ by the predetermined period of time $\Delta t$ behind the starting time of the sync pattern $C_2$, and outputs it as a sync signal CK. Also, the data $P_2$ extracted from the data section $D_2$ corresponding to the sync pattern $C_2$ is output as a data signal $S_0$ in synchronism with the sync pulse $K_2$. The controller 4 fetches the data $P_2$ in synchronism with the sync pulse $K_2$ to check the ID of the data $P_2$. In this case, the ID is "$DB_2$", and it is decided based on a standard that it is involved that the data block $DB_2$ follows the data block $DB_1$. This indicates that the preceding data block $DB_1$ and the next data block $DB_2$ are right. Consequently, it is also seen from the IDs that the extraction of the sync pattern $C_0$ of the data block $DB_0$ of "$DB_0$" has failed. The appearance time $t_p$ of the next sync pulse is predicted from a known period $\tau$. The reading from the memory 2 and the switching of the selector 1 are effected at a time point $(t_p - \Delta t)$ before the lapse of the predetermined period of time $\Delta t$ from the predicted appearance time $t_p$. The data blocks including and subsequent to the block $DB_0$ from which the extraction of the sync pattern has failed are read from the memory 2. The storage location of the sync pattern of the data block $DB_1$ from which the extraction has succeeded is known. Therefore, the storage location of the data block $DB_0$ dropped off is determined through calculation based on the storage location of the sync pattern of the data block $DB_1$ and the amount of data for one data block. The memory 2, which stores the serial signal $S_{IN}$, outputs the serial signal SD starting from the data block $DB_0$ in response to a read command AD from the controller 4. The memory 2, therefore, functions substantially as a delay circuit for delaying and outputting the serial signal $S_{IN}$. The switching command $S_C$ from the controller 4 causes the selector 1 to select the signal $S_D$, and therefore the signal $S_D$ is provided as the output signal $S_s$ from the selector 1.

The output circuit 3, upon failure to extract the sync pattern $C_0$ of the signal $S_s$, generates a protected sync pulse $H_0$ at a point in time after the lapse of time $\tau$ from the sync pulse $K_2$ and outputs it as the sync signal CK. Also, the data section $D_0$ is extracted from the output signal $S_s$ supplied from the selector 1 by the time $\tau$ behind the termination of the sync pattern $C_2$ of the preceding data block $DB_2$, and the data $P_0$ prepared from the data section $D_0$ is output as a data signal $S_0$ in synchronism with the protected sync pulse $H_0$. Subsequently, the output circuit 3 extracts the sync patterns and the data sections from the delayed serial signal $S_{IN}$ until the end of the data segment $SG_a$, generates the sync pulses and outputs them as the sync signal CK. Also, the data contained in the data section is output as the parallel data signal $S_0$ in parallel and in synchronism with the sync signal CK. Although the data $P_1$, $P_2$ are doubled in the data signal $S_0$, no problem is posed because the read signal is processed based on the ID of the data by a unit following the output apparatus 100 of an MT apparatus.

The controller 4, upon being informed of the end of the data segment $SG_a$ from the ID of the data in the data signal $S_0$, predicts the appearance time $t_q$ of the protected sync pulse $H_q$ expected to be output on the next occasion on the basis of the predetermined period of time $\tau$. The read operation from the memory 2 is stopped and the selector 1 is switched at the point in time $(t_q - \Delta t)$ advanced by a predetermined period of time $\Delta t$ from the predicted appearance time $t_q$, thereby returning to the initial states. The protected sync pulse may be output successively from the data segment $SG_a$ to the data segment $SG_b$. The same operation as above is performed also at the next data segment $SG_b$. In FIG. 3, however, the sync pattern $G_{n+1}$ of the leading data block of the data segment $SG_b$ is successfully extracted.

According to the aforementioned data outputting apparatus 100, if the memory 2 has the capacity of at least one data segment, and the sync pattern and the data section can be extracted even from the trailing two data blocks of the data segment, all of the data for the particular segment can be output without any drop-off in parallel to a sync signal. As a result, even if the extraction of sync patterns of several data blocks from the leading data block fails, the drop off of the sync pulses and the disappearance of the corresponding data can be positively prevented.

Figure 4:
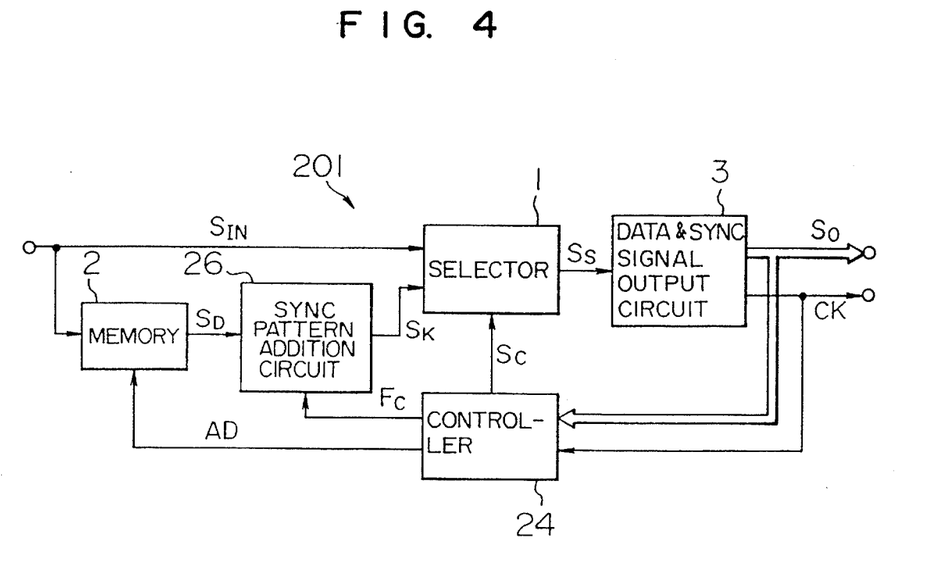
FIG. 4 is a block diagram of a data signal and sync signal outputting apparatus according to a second embodiment of the invention.

FIG. 4 is a block diagram showing a data sync signal outputting apparatus 201 according to the second embodiment of the invention. The data outputting apparatus 201, which is configured substantially the same way as the data outputting apparatus 100 according to the first embodiment, has a sync pattern addition circuit 26 inserted between the memory 2 and the selector 1, and a controller 24 instead of the controller 4 according to the first embodiment is used. The selector 1 selects either the serial signal $S_{IN}$ or the serial signal $S_k$ to which the sync pattern is added by the addition circuit 26, and outputs the selected signal. The memory 2 and the output circuit 3 are the same as those included in the first embodiment. The controller 24 reads and analyzes the parallel data signal $S_0$ at the timing of the sync signal CK and monitors to determine whether the output circuit 3 has successfully extracted the sync pattern. In the initial stage and while the success is determined, the switching command $S_C$ is sent to the selector 1 to cause the selector 1 to select the serial signal $S_{IN}$. If a failure is determined, by contrast, a read command AD is sent to the memory 2 in such a manner as to read from the memory 2 the data blocks including and subsequent to the one from which extraction of a sync pattern has failed. Also, the switching command $S_C$ is sent to the selector 1 in such a way as to select the serial signal $S_k$, to which the sync pattern has added. The timing of reading from the memory 2 and switching the selector 1 may be immediately after the determination of failure, and there is no need for waiting until the predicted appearance time of the next sync pulse as in the first embodiment. Further, the controller 24 sends out a sync pattern replacement command $F_C$ to the sync pattern addition circuit 26 in such a manner as to add instead of an old sync pattern a new sync pattern corresponding to the data block for which it is decided that extraction of the old sync pattern has failed. The sync pattern addition circuit 26 removes a sync pattern section of the read serial signal $S_D$ input thereto, and generates and outputs a serial signal $S_k$ to which the new sync pattern is added at a position designated by the sync pattern addition command $F_C$. The output circuit 3 is capable of extracting the data section and the sync pattern of the serial signal $S_k$ positively, and therefore can securely prevent the sync pulse from dropping off and the corresponding data from disappearing.

As described above, according to the second embodiment of the invention, in addition to the effect as in the first embodiment, new effect is obtained in which sending the read command AD or the switching command $S_C$ need not to be sent at a predicted appearance timing of the next sync pulse in order to make sure that the sync pattern can be extracted by the output circuit 3.

Figure 5:
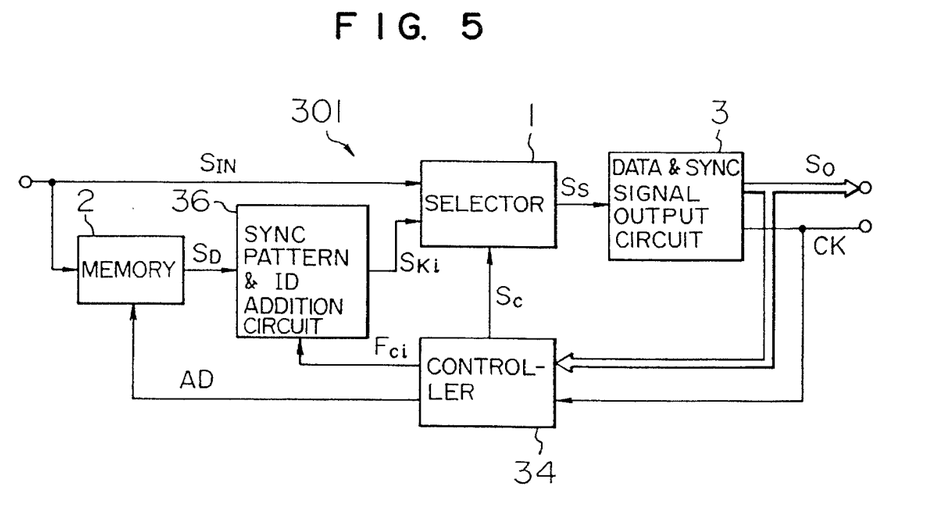
FIG. 5 is a block diagram of a data signal and sync signal outputting apparatus according to a third embodiment of the invention.

FIG. 5 is a block diagram showing a data signal and sync signal outputting apparatus 301 according to the third embodiment of the present invention.

This data signal and sync signal outputting apparatus 301 has substantially the same configuration as the data signal and sync signal outputting apparatus 201 according to the second embodiment. The difference of the third embodiment is in that the addition circuit 26 according to the second embodiment is replaced by a sync pattern/ID addition circuit 36 and the controller 24 according to the second embodiment by a controller 34. The selector 1, the memory 2 and the output circuit are the same as those used in the second embodiment.

The controller 34 reads and analyzes the data signal $S_0$ at a timing determined on the basis of the sync signal CK, and monitors to see whether the data signal and sync signal output circuit 3 has succeeded or failed in extracting a sync pattern. In the initial stage or while the success is being determined, the switching command $S_C$ is sent to the selector 1 in such a manner as to cause the selector 1 to select the serial signal $S_{IN}$. When a failure is decided, by contrast, the read command AD is sent to the memory 2 in order to read from the memory 2 the data blocks including and subsequent to the one from which the extraction of the sync pattern has failed. Also, the switching command $S_C$ is sent to the selector 1 in such a manner as to cause the selector 1 to select a signal $S_{ki}$ to which the sync pattern and ID are added. The timing of reading from the memory 2 and switching the selector 1 may be immediately after a failure determination, and there is no need for waiting for matching the predicted appearance time of the next sync pulse unlike in the first embodiment. Further, the controller 34 sends an addition command $F_{ci}$ to the addition circuit 36 to add a corresponding sync pattern and ID to the data block for which a failure of extraction of a sync pattern has been decided.

The addition circuit 36 removes an ID section and a sync pattern from the read serial signal $S_D$, and instead adds a new sync pattern and a new ID section as specified by the addition command $F_{ci}$ to the signal $S_D$ to output the added serial signal $S_{ki}$. The output circuit 3 is capable of extracting the sync pattern and the data section from the serial signal $S_{ki}$ positively. Therefore, the dropping off of the sync pulse and the disappearance of a corresponding data are positively prevented.

According to the third embodiment, as described above, the effect is added of restoring the ID appropriately when the ID goes out due to noise or the like.

Figure 6:
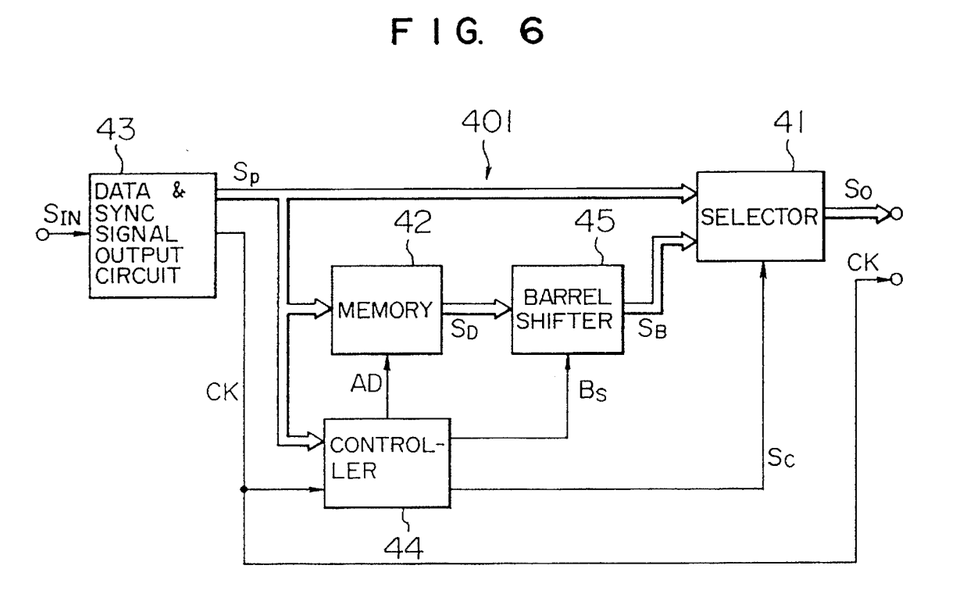
FIG. 6 is a block diagram of a data signal and sync signal outputting apparatus according to a fourth embodiment of the invention.

FIG. 6 is a block diagram showing a data signal and sync signal outputting apparatus 401 according to a fourth embodiment of the invention. The serial signal $S_{IN}$ is supplied to an output circuit 43. The output circuit 43 extracts a sync pattern from the serial signal $S_{IN}$. Upon extraction of a sync pattern, a sync pulse is generated for each sync pattern, and a sync signal CK is output. Further, the output circuit 43 produces a parallel signal $S_p$ with the sync patterns and data sections of the serial signal $S_{IN}$ being serial-parallel converted by 8 bits and outputs to the selector 41, the memory 42 and the controller 44 in parallel and synchronism with the sync signal CK. Also, the output circuit 43 has the function of generating a protected sync pulse in accordance with the predetermined period of time between sync patterns when there is at least one sync pattern extracted and no sync pattern could be extracted. Furthermore, in the case where a sync pattern cannot be extracted after the lapse of a predetermined period of time from the switching on of power, the output circuit 43 automatically generates a protected sync pulse at a period $\tau$. A parallel signal $S_p$ obtained by serial-parallel conversion of a serial signal $S_{IN}$ 8 bits 8 bits in phase with the phase of the protected sync pulse is supplied to the selector 41, the memory 42 and the controller 44.

The selector 41 selects a parallel signal $S_p$ or a regulated parallel signal $S_B$ from a barrel shifter 45, and supplies one of them in parallel to the sync signal CK as a data signal $S_0$. The memory 42 stores the latest parallel signal $S_p$ for the storage capacity thereof. The required storage capacity is one data segment in maximum and three data blocks in minimum. The memory 42 outputs the parallel signal $S_p$ subsequent to the portion designated by the read command AD from the controller 44 to the barrel shifter 45 as a read parallel signal $S_D$.

The barrel shifter 45 receives a portion corresponding to successive two 8-bit of the read parallel signal $S_D$, shifts the received portion serially by the number of bits issued from the controller 44, and adjusts the data section rightly to 8-bit parallel line. More specifically, if the sync pattern of the leading data block of the leading data segment is collapsed by noise or the like, the parallel signal $S_P$ does not form right parallel 8-bit configuration. Even when successive two 8-bit data from the read parallel signal $S_D$ are shifted serially by bits, therefore, the gap of parallel 8-bit configuration between the parallel signal $S_D$ and right parallel signal is modified, and the data area is parallelized by eight bits to provide a regulated parallel signal $S_B$.

The controller 44 reads and analyzes the parallel signal $S_p$ in synchronism with the sync signal CK, and monitors whether the extraction of the sync pattern by the output circuit 43 is successful or a failure. Assume, for example, that success is determined when the ID of the data appears without any drop-off from "$DB_0$" and a decision is a failure when there is any drop-off. During the initial stage and while a success is decided, a switching command $S_C$ is sent to the selector 41 in such a manner as to cause the selector 41 to select the parallel signal $S_p$. When the decision is a failure, on the other hand, the read command AD is sent to the memory 42 so that the data block corresponding to the ID of the data dropped off and subsequent data blocks may be read from the memory 42. Also, the switching command $S_C$ is sent to the selector 41 so that the selector 41 may select the regulated parallel signal $S_B$.

The timing of reading from the memory 42 and switching the selector 41 is set in such a manner as to predict the appearance time of the next pulse (or protected sync pulse) from the period of the sync pulse of the sync signal and output the regulated parallel signal $S_B$ as a data signal $S_o$ at the particular appearance time. The number of bits to be shifted by the barrel shifter 45 and the position of storage of the data block read from the memory 42 are determined by calculating reversely from the position of storage of the sync pattern of the data block successfully extracted. The controller 44, upon termination of the output of the data signal $S_O$ for a given data segment, switches and restores the selector 41.

According to the above-mentioned data outputting apparatus 401, as far as the capacity of the memory 42 is equivalent to one data segment and a sync pattern and a data section can be extracted only from the last two data blocks of the data segment, then all of the data of the particular data segment can be output without drop-off in parallel and in synchronism with the sync signal. As a result, even if extraction of sync patterns of several patterns from the leading data block fails, the drop-off of the sync pulse and the disappearance of the corresponding data are positively prevented. Further, the advantage of the fourth embodiment is that a low-cost memory with low access time can be used as the memory 42. This is because the data input-output format of the memory 42 is 8-bit parallel and therefore the high-speed access is not required even for a serial signal $S_{IN}$ of a high bit rate.

Figure 7:
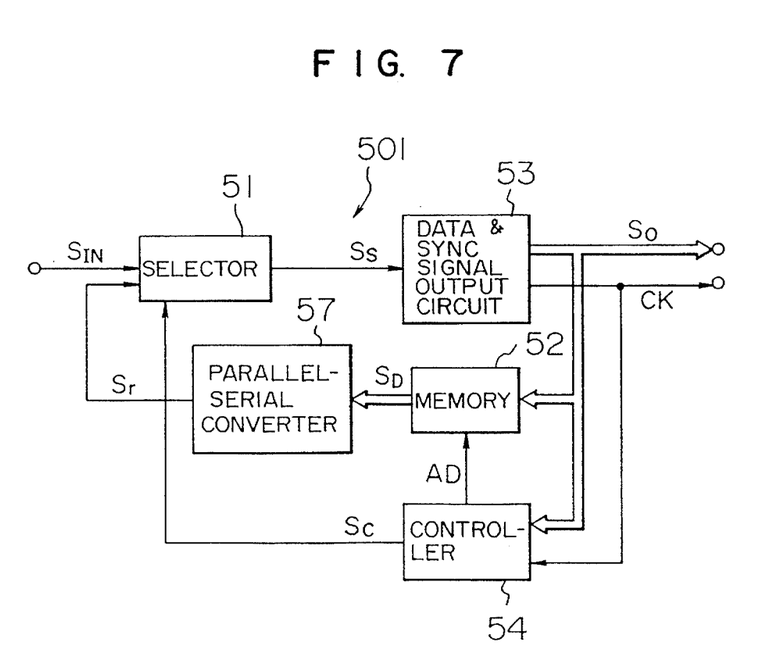
FIG. 7 is a block diagram of a data signal and sync signal outputting apparatus according to a fifth embodiment of the invention.

FIG. 7 is a block diagram showing a data signal and sync signal outputting apparatus 501 according to a fifth embodiment of the invention. The serial signal $S_{IN}$ is supplied to the selector 51. The selector 51 selects and outputs the serial signal $S_{IN}$ or the read serial signal $S_r$ outputted from a parallel-serial converter circuit 57. The output circuit 53 extracts a sync pattern from the serial signal $S'_s$. Upon extraction of a sync pattern, a sync pulse is generated for each sync pattern and is output as a sync signal CK. Further, the serial signal $S'_s$ for and subsequent to the sync pattern is subjected to serial-to-parallel conversion, 8 bits by 8 bits at a time, and supplied to the memory 52 and the controller 54 as a data signal $S_O$. Also, the output circuit 53 has the function of generating a protected sync pulse in conformity with the predetermined period of a sync pulse when there has been at least one sync pattern already extracted and the current sync pattern cannot be extracted.

Furthermore, the output circuit 53 generates a protected sync pulse automatically at a period of $\tau$ when a sync pattern cannot be extracted before the lapse of a predetermined period of time from the time power is thrown in. In phase with the particular protected sync pulse, the serial signal $S'_s$ is subjected to serial-parallel conversion, 8 bits by 8 bits at a time, and is output to the memory 52 and the controller 54 as a data signal $S_O$.

The memory 52 stores the latest data signal for the memory capacity thereof. The memory capacity for one data segment is required. Also, the data signal $S_O$ subsequent to the portion specified by the read command AD from the controller 54 is output to the parallel-serial converter circuit 57 by the memory 52 as a read data signal $S_D$. The parallel-serial converter circuit 57 converts an 8-bit read data signal $S_D$ into a one-bit read serial signal $S_r$.

The controller 54 reads and analyzes the data signal $S_O$ in synchronsim with the sync signal CK and monitors whether the data signal and sync signal output circuit 53 has succeeded or failed in extracting a sync pattern. Assume, for example, that success is determined if the ID of data appears without any drop-off from "$DB_0$", and failure is determined in the presence of a drop-off. The switching command $S_C$ is sent to the selector 51 in such a manner that the serial signal $S_{IN}$ is selected at the selector 51 from the initial stage until the data of the last data block of a given data segment is output. When the determination is failure, the read command AD is sent to the memory 52 in such a manner that the data blocks including and subsequent to the one corresponding to the ID of the dropped-off data is read from the memory 52. Also, the switching command $S_C$ is sent to the selector 51 in such a manner as to select the read serial signal $S_r$ by the selector 51. The timing of reading from the memory 52 and switching the selector is determined by predicting the appearance time of the next sync pulse (or the protected sync pulse) from the period of the sync pulse of the sync signal CK and setting the read serial signal $S_r$ to the particular appearance time. The storage position of the data block read from the memory 52 is determined by calculating reversely from the storage position of a sync pattern of the data block for which extraction has been successful. The controller 54 switches and restores the selector 51 to the initial stage when the output of the data signal $S_O$ for a given segment is ended and the reoutput of the data signal $S_O$ from a dropped-off data block terminates.

According to the data signal and sync signal outputting apparatus 501 described above, as far as the sync pattern and the data section are extracted only from the last two data blocks of a data segment, all of the data of the particular data segment can be output without any drop-off in parallel and in synchronism with the sync signal. As a result, even if an attempt to extract the sync pattern of the several data blocks from the leading one ends in failure, the drop-off of the sync pulses and the disappearance of the corresponding data are positively prevented. Further, the advantage of the fifth embodiment is that a low-cost memory with a low access time can be used as the memory 52. This is by reason of the fact that the data input-output format of the memory 52 is 8-bit parallel, and therefore high-speed access is not required even for the serial signal $S_{IN}$ of high bit rate. Also, the barrel shifter 45 can be done without, unlike in the fourth embodiment.

Another embodiment concerns a configuration additionally comprising an ID addition circuit similar to the sync pattern/ID addition circuit 36 according to the third embodiment without any sync pattern addition function in the data signal and sync signal outputting apparatus 101 according to the first embodiment. Still another embodiment may be provided by a data signal and sync signal outputting apparatus 401 according to the fourth embodiment and a data signal and sync signal outputting apparatus 501 according to the fifth embodiment, in which a sync pattern addition circuit, a sync pattern/ID addition circuit or an ID addition circuit is added. It will thus be understood from the foregoing description that according to a data signal and sync signal outputting apparatus according to the present invention, even if extraction of sync patterns of several data blocks from the leading one end in a failure, the drop-off of the sync pulses and the disappearance of the corresponding data are positively prevented.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. An apparatus for producing a sync signal and a parallel data signal from a serial signal representing a data segment which includes a plurality of blocks, each block comprising a data section, a sync pattern section and an ID section, said apparatus comprising:

storage means for receiving a serial signal input as a first reference serial signal, storing a predetermined number of latest blocks, sequentially reading each block in response to an input read instruction and outputting read blocks as a second reference serial signal;

selecting means for selecting one of the first reference serial signal and the second reference serial signal in response to an input switching signal;

output circuit means for receiving the selected signal, generating a sync pulse of a sync signal from a sync pattern of a sync pattern section of each block, generating a data signal by parallel conversion of blocks, wherein said output circuit means generates said sync pulse from a predetermined period between sync pulses generated by said output circuit means upon failure to generate the sync pulse from a sync pattern; and control means for first outputting the switching signal to said selecting means such that said selecting means selects the first reference serial signal, determining based on the data signal and said sync pulse generated by said output circuit means, whether or not said output circuit means has successfully extracted a sync pattern for each block, and outputting the read instruction to said storage means based on the received sync signal and the switching signal to said selecting means such that said selecting means selects the second reference serial signal when the failure is determined.

2. An apparatus according to claim 1, wherein said control means further includes means for issuing a replacement instruction for a specific block from which said output circuit means has failed to extract the sync pattern, and said apparatus further comprises means interposed between said storage means and said selecting means for replacing the sync pattern of the specific block of the read signal from said storage means with a right sync pattern in response to the replacement instruction from said control means.

3. An apparatus according to claim 1, wherein said control means further includes means for issuing a replacement instruction for a specific block from which said output circuit means has failed to extract the sync pattern, and said apparatus further comprises means interposed between said storage means and said selecting means for replacing the sync pattern and the ID for the specific block of the read signal from said storage means with a right sync pattern and the ID designated by the replacement instruction from said control means in response to the replacement instruction.

4. An apparatus according to claim 1, wherein said read instruction directs said storage means to output data corresponding to said sync pulse generated from a predetermined period between said sync pulses generated by said output circuit means.

5. An apparatus according to claim 1, wherein said control means outputs said switching signal on the basis of a period of said sync pulse generated by said output circuit means so that said read blocks from said storage means are output from said output circuit means in synchronism with a sync pulse generated after detection of the failure.

6. An apparatus according to claim 1, wherein said control means outputs said switching signal after determining the last two of three successive data signals as being correct when the first data signal of the three data signals is incorrect.

7. An apparatus according to claim 1, wherein said control means determines an appearance time of a next sync pulse on the basis of sync pulses generated by said output circuit means upon detection of the end of the data segment from said memory means, and said control means further terminates said read instruction and outputs said switching signal such that said selecting means selects the first serial signal before the appearance time.

\* \* \* \* \*